June 24, 1947.  J. BURGIN  2,422,884
ISOMERIZING OLEFINS USING BORIC OXIDE ON ALUMINA AS CATALYST
Filed March 26, 1943
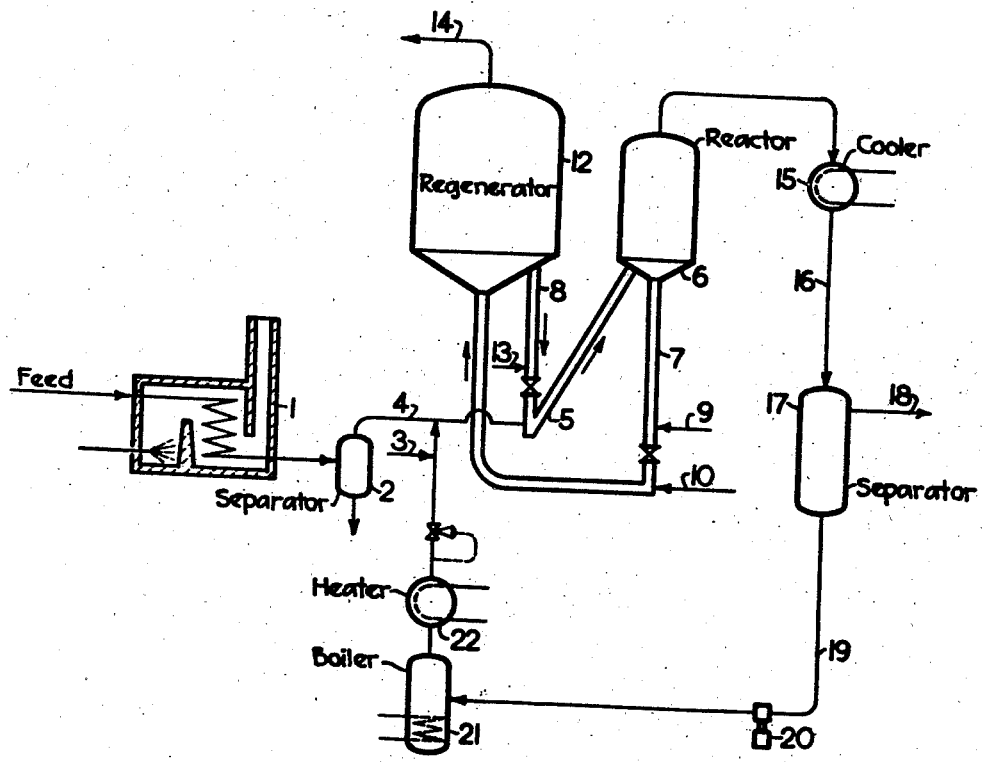
Inventor: James Burgin
By his Attorney: C. J. Ott Patented June 24, 1947

2,422,884

UNITED STATES PATENT OFFICE 2,422,884

ISOMERIZING OLEFINS USING BORIC OXIDE ON ALUMINA AS CATALYST

James Burgin, Oakland, Calif., assignor to Shell Development Company, San Francisco, Calif., a corporation of Delaware Application March 26, 1943, Serial No. 480,706

5 Claims. (Cl. 260—683.2)

1

This invention relates to a new and improved process for the isomerization of olefinic materials characterized by the use of special catalysts.

The object of the invention is to provide an improved process whereby various isomerizable olefinic compounds such, in particular, as the isomerizable olefins may be isomerized in good yields in a more economical manner.

As is known, most of the known and available olefinic compounds are capable of being converted to isomeric forms and in many cases the isomeric forms are much more valuable or much better suited for certain purposes. These isomerizations involve one or more of the following rearrangements: a shift of the ethylenic linkage; a shift of an acetylenic linkage, the formation of two ethylenic linkages from an acetylenic linkage, and shift of an alkyl group with change in the carbon skeleton. Isomerizations involving only the unsaturated linkages are generally relatively easy to effect and may be brought about with greater or lesser efficiency with a wide variety of catalysts. Isomerizations involving a shift of an alkyl group, on the other hand, are much more difficult to effect and generally require the use of special catalysts and relatively more drastic conditions.

The known catalysts which are most effective for the isomerization of olefinic materials are generally of the clay type. It is known that certain natural earths and clays have the ability of catalyzing the isomerizations of olefinic hydrocarbons. In most cases, however, the natural earths and clays require extensive acid treatment to make them suitable, and even then the activity is usually not selective and varies from batch to batch, depending upon the amount of impurities and other characteristics of the natural deposits. While these catalysts are quite effective in accelerating the isomerizations of various olefinic materials, they generally have the disadvantage that they also catalyze various polymerization reactions, thereby giving relatively poor yields. Catalysts of a neutral or alkaline character which have no appreciable polymerizing effect, on the other hand, have been found to be relatively inefficient in catalyzing isomerizations, particularly isomerizations involving the shift of an alkyl group. In view of the shortcomings of the natural materials and materials made by modification of the natural materials, considerable work has been done in attempts to develop synthetic catalysts of this general type having superior and more uniform properties in one or more respects such as increased activity, increased selectivity, decreased tendency to deposit carbon, etc. As a result of this work, several catalysts have been developed which in some respects are superior to the natural and modified natural products. Most of these "synthetic clay" catalysts consist essentially of alumina gels or silica in intimate admixture with minor amounts of alumina. Some of these are modified by small amounts of other agents such as zirconia, boria, etc. The exact nature of the combination of the silica and alumina is not entirely understood and the materials are variously referred to as "aluminum silicates," "hydrous aluminum silicates" and "blends of silica and alumina." These various catalysts are prepared by very exacting processes involving the preparation of hydrous gels, purification of the gels, blending, drying, pelleting, etc. They are very sensitive to slight variations in the methods of preparation, traces of impurities, the pH of the solutions used, the gelling and washing times, the temperatures, etc. Due largely to the cost of preparation, these catalysts are quite costly.

Although certain of these synthetic or modified catalysts are superior to the natural products, they nevertheless usually retain certain inherent shortcomings which so far have not been eliminated. The main shortcomings of the synthetic catalysts of this type are their inability to withstand temperatures above about 1100° F. without becoming deactivated, their inability to withstand the action of steam at elevated temperatures without suffering a loss in activity, and their high cost due to the complicated and lengthy processes required for their preparation.

According to the process of the present invention, various olefinic materials are catalytically isomerized more effectively and cheaply by the use of certain synthetically prepared catalysts which are exceptionally active in accelerating the isomerization of isomerizable olefinic materials including isomerizations involving change in the carbon skeleton and which are furthermore characterized by their exceptional ease and simplicity of manufacture, their exact reproducibility, and their refractive nature which enables them to retain their catalytic activity over extended periods of time under high temperature conditions of use and regeneration. These catalysts employed in the process of the present invention are devoid of any noticeable induction period and have exceptionally high initial activities. According to a specific embodiment of the invention, this characteristic of the catalysts is used to particular advantage by effecting the isomerization in a fluid catalyst or dust catalyst system of operation. The catalysts employed in the process of the present invention are also characterized by an exceptional ability to retain their activity under the relatively high temperature conditions of use in the presence of steam. According to another specific embodiment of the invention, this characteristic of the catalyst is utilized while affording a process in which the catalyst is continually or continuously regenerated in situ over extended periods of use.

According to the process of the invention, the olefinic material to be isomerized such, for example, as an isomerizable olefinic hydrocarbon is contacted under isomerizing conditions with special synthetically prepared calcined catalysts comprising a special form of alumina having certain specific concentrations of boric oxide ($B_2O_3$) deposited on the surface. The catalysts of the invention are prepared by impregnating a suitable alumina with a boric oxide or a boron compound decomposable to boric oxide by heat (for instance, boric acid) and subsequently subjecting the material to temperatures above about 300° C. to convert the boron compound to boric oxide ($B_2O_3$). The type of alumina employed, the concentration of boric oxide and the method of preparation are all critical factors. The alumina employed in the preparation of the catalysts of the invention is a very important constituent which coacts with the boric oxide to give catalytic properties not possessed by either constituent alone or by either constituent in other combinations. Thus, the alumina is not to be considered as simply a carrier or support for a catalytically active promoter.

In order to produce the catalysts of the invention having the desired superior properties, it is essential that the alumina employed have certain properties. As is known, there is a large variety of available aluminas prepared by different methods which differ in their physical and catalytic properties. The properties of the alumina which come into consideration, although the reasons are not fully understood, appear to be the physical form, the surface charge, the content of impurities, the density, the degree of hydration, the surface area, and the crystal lattice. These properties are determined by the methods of precipitation and treatment of the alumina. The desired form of alumina is crystalline and shows a distinct pattern of böhmite upon examination by electron diffraction. Suitable crystalline base alumina is obtained by certain slow precipitation methods in a granular or massive physical form. Regarding the surface charge, it is found that the alumina preferably has a negatively charged surface. Such a surface is indicated by an ability to selectively adsorb cations rather than anions. Thus, for instance, the preferred alumina readily adsorbs cationic dyestuffs such as methylene blue but does not readily adsorb anionic dyestuffs such as eosine A. Most aluminas such as alumina gels and aluminas used in mordanting, etc. have positively charged surfaces. Regarding the purity of the alumina, it may be stated that small amounts of impurities do not appear to be detrimental but, as will be pointed out below, may even be desirable. Regarding the degree of hydration, it may be stated that the preferred alumina contains between about 4% and 12% water as determined by loss on ignition. Alumina essentially in the gamma form, i. e. having less than about 4% water, is somewhat inferior but may also be advantageously used. The so-called trihydrates are very inferior and alpha alumina is totally unsuited. Regarding the density it is found that the preferred alumina has a bulk density between about .8 and 1.2. The surface area (as measured by adsorption of nitrogen), it is found, is preferably quite large but not generally above about 200 square meters per gram. Thus, the most suitable aluminas have been found to have surface areas between about 150 and 200 square meters per gram. The crystal lattice of the alumina is also important. Suitable aluminas belong to the gamma system. The beta alumina monohydrate (diaspore form) is unsuited. These various properties of the aluminas may be varied by change in the method of preparation. A suitable method of preparation which generally leads to alumina having the above-described characteristics is by the slow crystallization of alpha alumina trihydrate or beta alumina trihydrate from alkali aluminate solutions followed by partial dehydration of the trihydrate to a water content between about 4% and 12%. The aluminas so prepared contain appreciable concentrations of alkali, for instance, sodium. Thus, suitable aluminas may contain, for instance, from 0.3% to 2% of sodium. This is in sharp contrast to the clay-type catalysts hitherto used in which sodium is extremely detrimental and is removed as completely as possible. Certain selected bauxite ores such as the material sold in the trade by the Porocel Corporation under the trade name "Porocel" may also be employed and may be preferred in view of their much lower cost. Such matèrials, however, give catalysts of somewhat lower activity and selectivity than the synthetic materials prepared as described above. If they are used, they are preferably first treated, for instance, by known magnetic means, to remove the portion containing the larger part of the iron-containing particles which are invariably present, and carefully calcined to the desired state of hydration.

The alumina may be in the form of a fine powder, in the form of pellets or other formed pieces of suitable size, or it may be in the form of fragments of suitable size. For use in the various dust catalyst and fluid catalyst systems in which the present catalysts are particularly advantageous the alumina is preferably in a relatively finely divided state, although it is not essential that it be as fine as the ultimate catalyst.

The boria is incorporated in the surface of the alumina having the described characteristics. This is effected by impregnation. A suitable method is to soak the alumina particles, pellets or powder in a solution of boric oxide or a compound of boron which may be easily converted to boric oxide, for instance, by heating. Suitable boron compounds are, for example, boric acid, ammonium borate, fluoroboric acid, various organic compounds of boron such as the boric acid esters and alkyl boranes. After impregnation the impregnated boron compound is converted to boric oxide, for instance, by drying and then calcining at a temperature above about 300° C. In many cases two or more such impregnations and calcinations are necessary to impregnate the alumina with the desired amount of boric oxide. The final calcination may, if desired, be effected in the reaction zone under the reaction conditions.

The activity of the catalyst increases with increasing concentrations of boric oxide up to a certain concentration and then declines. The optimum concentration appears to be that sufficient to form a monomolecular layer of boric oxide on the available surface of the alumina, or about $6\times10^{-4}$ grams boric oxide per square meter of available surface (as measured by adsorption of nitrogen). The concentration may vary from this optimum, however, while affording practical catalysts. Thus, concentrations ranging between about $1.5\times10^{-4}$ g./m.$^2$ and about $9.5\times10^{-4}$ g./m.$^2$ may be employed and a preferred range is between about $5\times10^{-4}$ g./m.$^2$ and $8.6\times10^{-4}$ g./m.$^2$. In the preferred aluminas which generally have a surface area between about 150 and 190 m.$^2$/g. this corresponds to a preferred range of concentrations of boric oxide between about 7.5% and 16.3% based on the alumina, or between about 7.0% and 14% based on the total catalyst.

The following examples which are not intended to limit the invention in any way are submitted for the purpose of illustrating various points, the understanding and appreciation of which are necessary for the proper appreciation of the invention.

The alumina I employed in most of the preparations described below was a preferred alumina having the desired characteristics and properties specified above. It was prepared by the partial dehydration of batches of a massive variety of alumina trihydrate crystallized slowly from sodium aluminate solutions and had the following properties:

| | |
|---|---|
| Particle size | 8–14 mesh massive fragments |
| Bulk density | About 0.8–0.9 |
| Particle density | About 1.4–1.6 |
| Surface | Selectively adsorbs cationic dyes |
| Surface area | 180–190 square meters per gram |
| $Al_2O_3$ | About 88%–94% |
| $H_2O$ | About 6%–12% |
| $Na_2O$ | About 0.5%–1% |

The bulk density is defined as the weight in kilograms of a liter of the 8–14 mesh particles. This figure is closely related to the particle density. The particle density is defined as the weight in grams of a 1-centimeter cube of the alumina. The surface area is that determined by nitrogen adsorption by the known methods. Water content is determined by loss on ignition.

Alumina II was the above-mentioned special activated bauxite sold under the trade name "Porocel." It had the following properties:

| | |
|---|---|
| Particle size | 8–14 mesh |
| Bulk density | About 0.9 |
| Surface | Adsorbs cationic dyes |
| Surface area | About 160 square meters per gram |
| $Al_2O_3$ | About 70% |
| $H_2O$ | About 8.4% |
| $Na_2O$ | About 0.9% |
| $Fe_2O_3$ | About 8.6% |
| $SiO_2$ | About 8.7% |
| $TiO_2$ | About 3.4% |

Alumina III was a synthetic alumina essentially in the gamma form. It was prepared by dehydrating an alumina trihydrate crystallized from a sodium aluminate solution and had the following properties:

| | |
|---|---|
| Particle size | ⅛ inch pellets |
| Bulk density | About .9 |
| Surface | Adsorbs cationic dyes |
| Surface area | About 90 m.$^2$/g. |
| $Al_2O_3$ | About 95% |
| $H_2O$ | About 4.7% |
| $Na_2O$ | About 0.6% |

Alumina IV was essentially the same as alumina III except that it was in the form of a powder.

Alumina V was a powdered alumina prepared by dehydrating an alumina trihydrate obtained from an alkali aluminate solution obtained in the treatment of certain chrome ores. It is produced and sold by the National Products Refining Company. After dehydration it had the following properties:

| | |
|---|---|
| Particle size | About 300 mesh powder |
| Surface | Selectively adsorbs cationic dyes |
| Surface area | About 150 m.$^2$/gram (estimated) |
| $Al_2O_3$ | About 94% |
| $H_2O$ | About 5% |
| $Na_2O$ | About 0.6% |

Example 1

A quantity of alumina I was boiled under reflux with 2 volumes of a 25.9% aqueous solution of boric acid for 18 hours. The excess boric acid solution was removed and the impregnated alumina was then dried at 110° C. and finally calcined at 500° C. for 6 hours. The resulting catalyst contained about 12.6% $B_2O_3$.

Example 2

A quantity of alumina I was impregnated with an equal volume of a 17% solution of boric oxide in absolute methanol. The impregnated granules after drying contained about 7.3% $B_2O_3$.

Example 3

A quantity of alumina I was heated under reflux at 80° C. for several days with an equivalent volume of a 17.5% solution of boric oxide in absolute ethanol. The impregnated granules after drying contained about 9.8% $B_2O_3$.

Example 4

A catalyst was prepared as in Example 3. A quantity of this catalyst was heated at 80° C. with an equal volume of a 17% solution of boric oxide in absolute ethanol. After drying the impregnated granules contained about 13.5% $B_2O_3$.

Example 5

Three volumes of alumina I were heated at 80° C. with 5 volumes of a 17.5% solution of boric oxide in absolute ethanol, which was kept saturated by the addition of increments of boric oxide to the solution. This was continued until no further decrease in boric oxide content of the solution was noted. After drying the impregnated granules contained about 13.8% $B_2O_3$.

Example 6

A quantity of alumina I was heated at 70° C. for 5 hours with an equal volume of an 11% solution of boric oxide in isopropyl alcohol. The impregnated granules after drying at 110° C. and calcining at 500° C. for 8 hours contained about 10.1% $B_2O_3$.

Example 7

A quantity of alumina I was heated in a thermal circulator with 4 volumes of an 11% solution of boric oxide in isopropyl alcohol which was maintained at saturation by the addition of increments of boric oxide. (A thermal circulator is an apparatus in which circulation of a liquid is effected by heating it in one section and cooling it in another.) After drying the granules contained 12.4% $B_2O_3$.

Example 8

A quantity of alumina I was impregnated with an equal volume of commercial triethyl borate for a contact time of 40 hours. The impregnated granules after drying contained about 5.3% $B_2O_3$.

Example 9

A quantity of alumina I was boiled under reflux for 4 hours with 2 volumes of an 8.5% solution of boric oxide in secondary butyl alcohol. After drying the catalyst contained about 10.5% $B_2O_3$.

Example 10

A quantity of alumina I was heated at 150° C. with an equal volume of a 9.3% solution of boric oxide in ethylene glycol. After drying at 110° C. and calcining at 500° C. for 28 hours the catalyst contained about 8.7% $B_2O_3$.

Example 11

A quantity of alumina I was heated under reflux for 2 hours with 2 volumes of a 9% solution of boric oxide in secondary amyl alcohol. After drying at 110° C. and calcining at 500° C. for 16 hours the catalyst contained about 14.3% $B_2O_3$.

Example 12

Five volumes of alumina I were heated for 2 hours at 130° C. with 7 volumes of a 23% solution of boric oxide in glycerine. The granules after drying at 110° C. and calcining at 500° C. for 56 hours contained about 13% $B_2O_3$.

Example 13

A quantity of alumina I was heated at 150° C. for 4 hours with 2 volumes of a 4.6% solution of boric oxide in normal decanol. After drying at 110° C. and calcining at 500° C. for 24 hours the catalyst contained about 5.9% $B_2O_3$.

Example 14

A quantity of alumina I was boiled under reflux for 20 hours with 3 volumes of an aqueous solution containing about 12% boric acid and about 30% mannitol. After drying at 110° C. and calcining at 500° C. for 6 hours the catalyst contained about 6.7% $B_2O_3$.

Example 15

A quantity of alumina I was boiled under reflux for 18 hours with 2 volumes of an aqueous solution containing about 10% acetic acid and about 23% boric acid. After drying at 110° C. and calcining at 500° C. for 6 hours the catalyst contained about 10.3% $B_2O_3$.

Example 16

A quantity of alumina I was heated under vacuum for about 2 hours at about 200° C. and then cooled. The alumina, while still under vacuum, was then soaked for 18 hours in an excess of a saturated aqueous solution of boric acid. The excess boric acid solution was then removed and the alumina was dried for 16 hours at about 100° C. The resulting catalyst contained the equivalent of about 2.9% $B_2O_3$.

Example 17

A quantity of alumina I was heated under vacuum for about 2 hours at about 200° C. and then cooled. The alumina, while still under vacuum, was then soaked for 18 hours in an excess of a saturated aqueous solution of boric acid. The excess boric acid solution was then removed and the alumina was dried for 16 hours at about 100° C. This impregnation was repeated in the same manner. The resulting catalyst contained the equivalent of about 5.7% $B_2O_3$.

Example 18

A quantity of alumina I was treated in a thermal circulator at a temperature of about 90° C. for about one week with an excess of a 1N solution of hydrochloric acid. It was then washed with water until the water-washings tested free of chlorides. The material was then calcined at 500° C. for 5 hours and then impregnated with boric oxide in the manner described in Example 17. The catalyst contained about 6.9% $B_2O_3$ and 0.35% Cl.

Example 19

A portion of alumina II was treated to separate the particles containing the major portion of the iron impurities. The remaining portion was impregnated with boric oxide in the manner described in Example 17. The resulting catalyst contained about 4.7% $B_2O_3$ and about 0.75% Fe.

Example 20

A portion of alumina I was treated with a 1N solution of hydrochloric acid and then washed with water until the washings were substantially free of chlorides. The alumina was then dried and heated under reflux with 2 volumes of an 11% solution of boric oxide in isopropyl alcohol. After drying at 110° C. and calcining at 500° C. for 8 hours, the catalyst contained about 10.2% $B_2O_3$.

Example 21

A quantity of alumina I was calcined at 700° C. for 6 hours to transform it substantially into gamma alumina. The alumina was then refluxed with 2 volumes of an 11% solution of boric oxide in isopropyl alcohol. The resulting catalyst contained about 8.6% $B_2O_3$.

Example 22

A quantity of alumina I was soaked in an equal volume of a 10% solution of acetic acid. The alumina was then dried at 110° C. and calcined at 450° C. for 6 hours. It was then heated under reflux for 18 hours with 2 volumes of a 23% aqueous solution of boric acid. The resulting catalyst contained the equivalent of about 11% $B_2O_3$.

Example 23

A quantity of alumina I was washed with a 0.1 molar solution of aluminum nitrate for 2½ hours. The granules were then washed with water until substantially free of nitrate and dried at 110° C. The alumina was then heated under reflux for 4 hours with 2 volumes of a 25.9% boric acid solution. After drying at 110° C. and calcining at 500° C. for 6 hours the catalyst contained about 12.5% $B_2O_3$.

Example 24

A quantity of alumina I in the form of a 100–200 mesh powder was heated under reflux for 20 hours with 2 volumes of an aqueous 25.9% solution of boric acid. The impregnated powder was dried at 110° C., pelleted into $\frac{1}{2}$-inch pills and calcined at 500° C. for 6 hours. The resulting catalyst contained about 14.2% $B_2O_3$.

Example 25

A volume of alumina III was heated under reflux with 2 volumes of an 11% solution of boric oxide in isopropyl alcohol. After drying and calcining at 500° C. for 8 hours the catalyst contained about 5.7% $B_2O_3$.

Example 26

A quantity of alumina IV was boiled under reflux for 2 days with 2 volumes of a 25.9% aqueous boric acid solution. The powder was dried at 110° C., pelleted into 1/8-inch pills, and calcined at 500° C. for 12 hours. The resulting catalyst contained about 14% $B_2O_3$.

Example 27

A catalyst was prepared as described in Example 17. This catalyst was employed for the isomerization of a normal pentene fraction containing about 96% normal pentene under the following conditions:

Temperature _____°C__ 500
Liquid hourly space velocity_____ 4
Pressure _____ Substantially atmospheric About 36.8% of the normal pentene was converted to isopentene. The ratio of isopentene to normal pentene in the product was about 1.51.

Example 28

A catalyst was prepared as described in Example 17. This catalyst was employed for the isomerization of a normal pentene fraction containing about 96% normal pentene under the following conditions:

Temperature _____°C__ 500
Liquid hourly space velocity_____ 3
Pressure _____ Substantially atmospheric About 48.6% of the normal pentene was converted to isopentene. The ratio of isopentene to normal pentene in the product was about 1.58.

From the above examples, it is seen that the activity of typical catalysts of the invention is very high and, in fact, too high to give optimum results under the standard test conditions of the examples.

That compounds of boric oxide are not equivalent to boric oxide in the present catalysts is illustrated by the following example:

Example 29

A portion of alumina I was heated under reflux for 17 hours in a boiling solution of a 17% solution of sodium borate. After drying at about 110° C. and calcining at 500° C. for 8 hours, the catalyst contained the equivalent of about 9.2% $B_2O_3$. This catalyst was found to be substantially inactive.

The exceptional stability of the present catalysts against deterioration upon being subjected to high temperatures is illustrated in the following examples:

Example 30

A catalyst prepared as described in Example 1 and containing about 12.5% $B_2O_3$ was heated at 725° C. (1337° F.) for 5 hours in an atmosphere of nitrogen. This drastic heat treatment produced no noticeable change in the activity of the catalyst.

As stated above, the preferred alumina used in the preparation of the catalysts of the invention is a crystalline and preferably massive variety obtained by the partial dehydration of certain alumina trihydrates crystallized from alkali aluminate solutions. Such materials invariably contain appreciable concentrations of impurities such, in particular, as alkali salts intimately associated with the alumina. Although aluminas of this type are preferred, the alumina may sometimes be treated with acid prior to incorporating the boric oxide. This changes the character of the resulting catalyst considerably and catalysts so prepared are not to be considered as the full equivalents to those not so treated in the preparation. Such pretreatment of the alumina is, however, permissible and desirable in certain cases such, for instance, as where the alumina contains an abnormally large amount of alkaline impurities.

The use of a catalyst prepared with a pretreated alumina is illustrated in the following example:

Example 31

A catalyst was prepared as described in Example 18. This catalyst was employed for the isomerization of a normal pentene fraction containing about 91% normal pentene under the following conditions:

Temperature _____°C__ 500
Liquid hourly space velocity_____ 3
Pressure _____ Substantially atmospheric About 28.1% of the normal pentene was converted to isopentene to give a product in which the ratio of isopentene to normal pentene was about 1.38.

As pointed out above, the boric oxide and the specific type of alumina of the catalysts of the invention coact in some manner to produce particularly desirable and superior catalysts. Boric oxide alone is a very poor catalyst and its addition to other materials and other types of alumina gives inferior catalysts. In many cases the addition of boria to catalysts having a certain isomerizing activity affords no noticeable improvement and in some cases even appears detrimental.

The isomerization of the above-described materials with the aid of the above-described catalyst is carried out by contacting the olefinic material to be isomerized usually in the vapor phase with the above-described catalysts under the above-mentioned isomerizing conditions. The process may be carried out in any of the known fixed bed, moving bed, or fluid catalyst systems. In the fixed bed system the catalyst, usually in the form of pellets or fragments of suitable size, is supported in a fixed bed in a suitable converter or catalyst case and the vapors of the material to be isomerized either per se or with appropriate diluents, are passed in contact therewith under suitable conditions. In the moving bed system, means are provided for continuously or intermittently removing a portion of the catalyst bed and continuously or intermittently adding fresh or regenerated catalyst to the bed.

As pointed out above, the catalysts of the invention show no substantial induction period and have very high initial activity. They are therefore particularly adapted for use in effecting various isomerizations in a so-called fluid catalyst or dust catalyst system of operation. There are a number of dust systems of operations, any one of which may be applied. Thus, for example, the systems described in World Petroleum, 12th Annual Refinery Issue, pages 52–55, may be used. In the so-called fluid catalyst systems of operation, of which there are several applicable variations, the catalyst is in a finely divided "fluidized" state and is continuously transported by gravity and/or gaseous media through a reaction zone, a regeneration zone and usually one or more flushing zones. One suitable fluid catalyst system is illustrated diagrammatically by conventional figures not drawn to scale in the attached drawing. Referring to Figure I, an isomerizable olefin to be isomerized is vaporized and heated to a suitable reaction temperature in a suitable heater 1. Any unvaporized material such as tar, carbon, etc., is separated from the vapors in separator 2. The preheated vapors, if desired, in admixture with steam and/or inert gas and/or promoting substances which may be introduced via line 3, pass via lines 4 and 5 to a converter 6 containing a body of the finely divided catalyst in a fluidized condition. The conditions in reactor 6 depend upon the particular material being isomerized, the age of the catalyst, etc., and are adjusted in the conventional manner to afford a substantial isomerization. During the process, a portion of the fluidized catalyst is continuously withdrawn via line 7 and an equivalent quantity of freshly regenerated catalyst is picked up from line 8 and carried to the reactor with the feed via line 5. A flushing gas such as steam is introduced into line 7 via line 9 to prevent the finely divided catalyst from plugging the line and to strip it of the larger part of occluded volatile materials. The catalyst withdrawn via line 7 is picked up by a stream of oxygen-containing gas such as air or a mixture of air and flue gas, or air and steam entering via line 10 and is carried via line 11 to a regenerator 12 wherein carbonaceous deposits on the catalyst are burnt off. The freshly regenerated catalyst is withdrawn from the regenerator 12 via line 8. A small amount of inert gas such as flue gas, air or steam may be introduced into the lower part of line 8 via line 13 to maintain the catalyst in a fluidized condition. The spent regeneration gas is withdrawn via line 14. The vaporous reaction product passes overhead from reactor 6 to a cooler 15. The product from 15 may be treated in any of the conventional manners to separate recycle gas, if any, and if desired to separate the isomerized product from the unconverted material which may, if desired, be recycled.

In many isomerization reactions it is very desirable to be able to employ a certain amount of steam. The use of steam as a diluent lowers the partial pressure of the reactant and reaction product and generally tends to reduce side reactions. When using certain natural clays as isomerization catalysts, steam may be employed. The synthetic catalysts, however, are relatively quickly deactivated at the relatively high temperatures in the presence of steam and when using such expensive catalysts the use of steam is generally prohibited. The catalysts of the present invention unlike most of the hitherto known synthetic catalysts may be used with steam. When employing appreciable concentrations of steam in the present process, it is advantageous to introduce into the reaction zone with the steam a small amount of boric acid. This prevents a loss of boric oxide from the catalyst and furthermore, it is found, maintains the activity of the catalyst at substantially its initial activity over long periods of time.

The amount of boric acid or its equivalent necessary when using steam is dependent upon the temperature and upon the amount of steam applied. In general, only very small amounts in the order of 0.1 to 5% of the steam are sufficient. Such amounts of boric acid or its equivalent may be introduced with the feed in any one of a number of ways which will be obvious to those skilled in the art. One suitable method is, for example, to vaporize a solution of boric acid of such concentrations and under such conditions of temperature and pressure that the steam contains the desired concentration of boric acid. Another suitable method is to pass the steam or the total feed through a mass containing boric oxide or boric acid. Another suitable method is to flash evaporate a solution of boric acid or its equivalent of the desired concentration.

The boric acid or its equivalent supplied with the steam, when steam is used, need not be wasted but may be reused indefinitely. Thus, for example, the product may be condensed, in which case the boric acid applied is found in the condensed water phase and this boric acid solution may be vaporized and reused. One embodiment of this method of operation is illustrated in the attached drawing. Thus, the product from cooler 15 passes via line 16 to a separator 17 wherein the condensed steam containing the boric acid in solution separates as a lower layer. The hydrocarbon product is withdrawn via line 18. The condensed water layer containing the boric acid passes via line 19 and pump 20 to a boiler 21 wherein it is vaporized under such conditions of temperature and pressure that the steam contains the desired concentration of boric acid vapors. The steam containing the desired concentration of boric acid is superheated in a heater 22 and then expanded through a pressure-regulating valve 23 into line 24 by means of which it is introduced in the desired amounts into the hydrocarbon feed in line 4.

The process of the invention may be advantageously employed for the isomerization of various isomerizable olefinic materials such, for instance, as the various vaporizable and isomerizable olefins, halogen-substituted olefins, acetylenic hydrocarbons, diolefins, terpenes and the like. In such cases when the shift of an alkyl group, for instance, a methyl group, is structurally possible and thermodynamically favorable this relatively deep-seated rearrangement may generally be effected with excellent results. Also, by employing relatively mild isomerization conditions it is possible to effect a selective isomerization by a shift in unsaturated bonds where this is thermodynamically favorable. Many of these latter types of isomerizations are exceedingly easy to effect, however, and the advantages of the present process are therefore not so pronounced. Particularly important applications of the process of the invention are, for example, the isomerization of isobutylene to normal butylene in the manufacture of butadiene, the isomerization of normal butylene to isobutylene in the production of "alkylate," the isomerization of normal pentene to isopentene in the production of aviation gasoline, and the like.

According to the process of the invention the various materials to be isomerized are contacted with the above-described catalysts under conditions chosen with respect to the particular material treated to give predominantly the desired isomerization with little or no formation of lower boiling and lower molecular weight products. These conditions are generally similar to those known to be suitable when employing other catalysts of the general type, i. e. clay, bauxite, etc. Thus, the conditions are relatively mild when it is desired to effect isomerization involving only a shift of an unsaturated linkage and are relatively more severe when it is desired to effect a shift of an alkyl group. Typical conditions are, for example, between the following approximate limits:

| | |
|---|---|
| Temperature °F | 650–1000 |
| Pressure atm | 0.5–10 |
| Liquid hourly space velocity | 0.5–10 |
| Mol ratio of steam to hydrocarbon | 0–10 |

These limits are not to be taken as rigidly fixed but only as indicative of bounds outside of which it is ordinarily unnecessary to go in carrying out the process. The conditions with respect to any of the above conditions which will be optimum under any given set of circumstances will depend upon the other conditions as well as upon such factors as the particular feed, the plant design, the particular isomerization desired, etc.

As in all catalytic processes of the general type, the catalyst becomes fouled during use with carbon and/or tarry deposits. If it is desired to reuse the catalyst, as will usually be the case, it is necessary to periodically remove these deposits. This may be effected with the described catalysts either completely or partially in any of the conventional manners. In fixed bed operations it is usually effected in situ. In the moving bed and fluid catalyst systems of operation, the regeneration is usually effected in a separate regeneration zone. The carbonaceous deposits are preferably partially removed by physical treatment such as flushing, application of vacuum, steaming or the like, and then by combustion of remaining carbonaceous materials under conditions controlled to avoid excessive overheating of the catalyst. It is also advantageous, particularly when no steam is employed as a diluent, to supply boric acid with the steam used for flushing, regeneration, etc. Thus, for example, in the fluid catalyst system illustrated in the drawing the steam introduced via line 13 and/or 9 and/or 10, if steam is applied, may advantageously contain boric acid vapors, for example, 0.3–5%. This allows a certain amount of continuous regeneration of the catalyst.

The material to be isomerized may be contacted with the catalyst alone or, if desired, it may be contacted with the catalyst in the presence of one or more diluents or added agents other than steam, such for instance as alkyl halides, spent regeneration gas, non-isomerizable hydrocarbons, hydrogen or the like. Alkyl and hydrogen halides in small concentrations sometimes act as promoters increasing the rate of isomerization. Spent regeneration gas may sometimes be used to advantage as a diluent. Various vaporizable inert hydrocarbons, such for instance as various saturated hydrocarbons often present in appreciable concentrations in the olefinic materials, may also be present.

The catalysts hitherto recommended and employed for isomerization, when spent after a period of use, are discarded. This is because the deactivation is caused by internal changes in the structure of the catalysts, and no method for restoring their activity is known. As pointed out above, the catalysts of the present invention are particularly stable against such changes leading to deactivation. When, after a period of use, the activity has declined to a given level it is therefore possible to regenerate or remake the catalysts. Thus, the catalysts after being used for long periods of time may be brought back to about 85%–90% of their original activity by simply subjecting them to one of the described impregnations with boric oxide.

I claim as my invention:

1. In a process for the catalytic conversion of an isomerizable olefinic compound to an olefinic isomer thereof, the improvement which comprises contacting the olefinic compound to be isomerized under isomerizing conditions with a catalyst consisting essentially of an adsorptive alumina obtained by the partial dehydration of an alumina trihydrate crystallized from an alkali aluminate solution and having incorporated on the available surface between about $1.5 \times 10^{-4}$ and $9.5 \times 10^{-4}$ grams of boric oxide per square meter.

2. In a process for the catalytic conversion of an isomerizable olefinic compound to an olefinic isomer thereof, the improvement which comprises contacting the olefinic compound to be isomerized under isomerizing conditions with a catalyst consisting essentially of an adsorptive crystalline alumina having a negatively charged surface obtained by the partial dehydration of an alumina trihydrate to a water content between about 4% and 12% and having incorporated on the available surface between about $1.5 \times 10^{-4}$ and $9.5 \times 10^{-4}$ grams of boric oxide per square meter.

3. In a process for the catalytic conversion of an isomerizable olefinic compound to an olefinic isomer thereof, the improvement which comprises contacting the olefinic compound to be isomerized under isomerizing conditions with a catalyst consisting essentially of an adsorptive alumina obtained by the partial dehydration of an alumina trihydrate crystallized from an alkali aluminate solution having incorporated on the available surface between about $5 \times 10^{-4}$ and $8.6 \times 10^{-4}$ grams of boric oxide per square meter.

4. In a process for the catalytic conversion of a butylene to an isomeric butylene, the improvement which comprises contacting a butylene to be isomerized under isomerizing conditions with a catalyst consisting essentially of an adsorptive alumina obtained by the partial dehydration of an alumina trihydrate crystallized from an alkali aluminate solution and having incorporated on the available surface between about $1.5 \times 10^{-4}$ and $9.5 \times 10^{-4}$ grams of boric oxide per square meter.

5. In a process for the catalytic conversion of an amylene to an isomeric amylene the improvement which comprises contacting an amylene to be isomerized under isomerizing conditions with a catalyst consisting essentially of an adsorptive alumina obtained by the partial dehydration of an alumina trihydrate crystallized from an alkali aluminate solution and having incorporated on the available surface between about $1.5 \times 10^{-4}$ and $9.5 \times 10^{-4}$ grams of boric oxide per square meter.

JAMES BURGIN.

REFERENCES CITED

The following references are of record in the file of this patent:

UNITED STATES PATENTS

| Number | Name | Date |
|---|---|---|
| 2,301,342 | Sumerford et al. | Nov. 10, 1942 |

OTHER REFERENCES

Ewell et al., Jour. Am. Chem. Soc., vol. 63, 3460–5 (1941), Patent Office Library.